Figure 1:
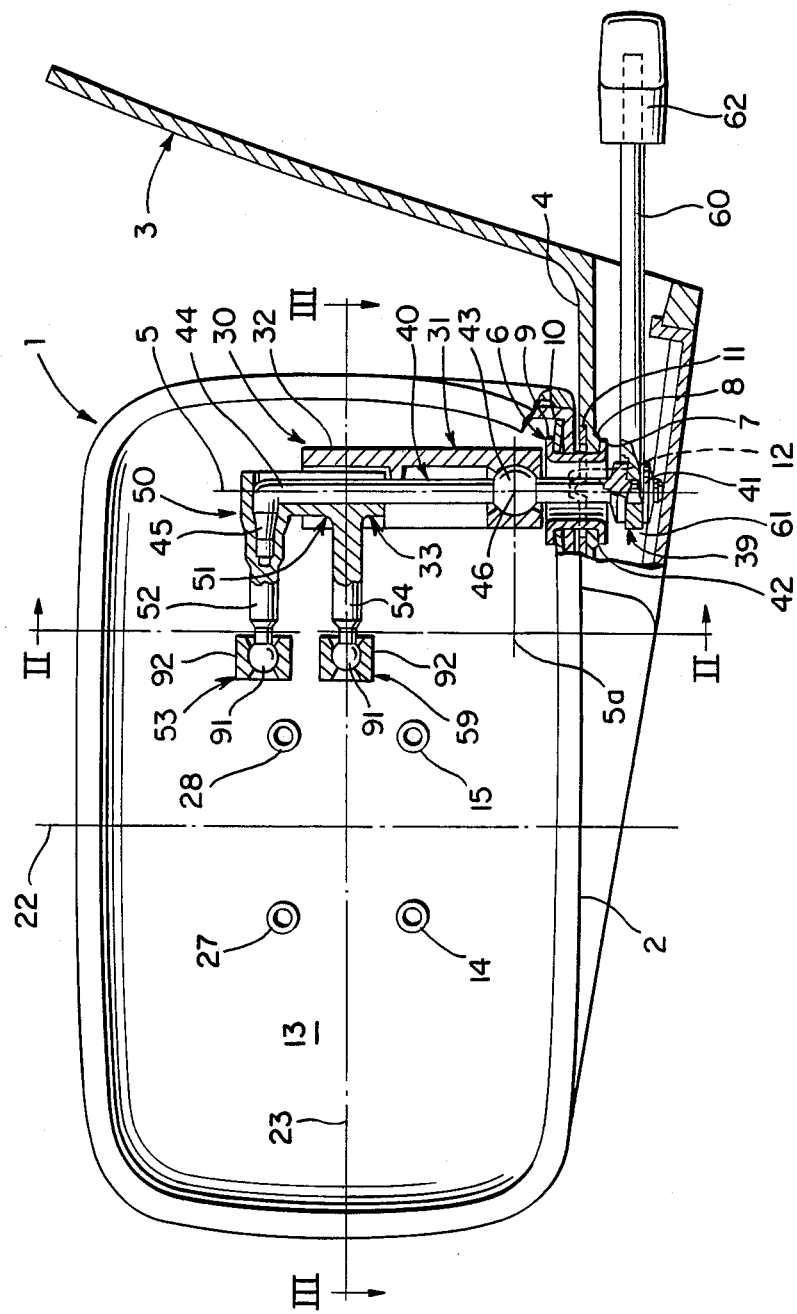

United States Patent [19]

Polzer et al.

[11] Patent Number: 4,856,886
[45] Date of Patent: Aug. 15, 1989

[54] OUTSIDE REAR-VIEW MIRROR HAVING A MECHANICALLY ADJUSTABLE MIRROR GLASS FOR A VEHICLE

[75] Inventors: Herwig W. Polzer, Miltenberg; Edwin Seitz, Neuenbuch, both of Fed. Rep. of Germany

[73] Assignee: Hohe KG, Collenberg, Fed. Rep. of Germany

[21] Appl. No.: 118,071

[22] Filed: Nov. 9, 1987

[30] Foreign Application Priority Data

Nov. 10, 1986 [DE] Fed. Rep. of Germany ....... 3638245
Nov. 14, 1986 [DE] Fed. Rep. of Germany ....... 3638876

[51] Int. Cl.[4] .............................. G02B 7/18; B60R 1/06
[52] U.S. Cl. ..................................... 350/635; 248/484; 248/485; 350/636; 350/640
[58] Field of Search ....................... 350/635, 636, 640; 248/479, 484, 487, 485

[56] References Cited

U.S. PATENT DOCUMENTS

| | | | |
|---|---|---|---|
| 4,279,473 | 7/1981 | Yamana | 350/635 |
| 4,548,483 | 10/1985 | Moro et al. | 350/635 |
| 4,558,840 | 12/1985 | Manzoni | 350/635 |
| 4,660,944 | 4/1987 | Suzuki et al. | 350/635 |

FOREIGN PATENT DOCUMENTS

| | | |
|---|---|---|
| 0074753 | 3/1983 | European Pat. Off. ............ 350/635 |
| 7806907 | 4/1981 | Fed. Rep. of Germany . |
| 8701766 | 8/1987 | Fed. Rep. of Germany . |
| 3638876 | 5/1988 | Fed. Rep. of Germany . |
| 2163109 | 7/1973 | France . |
| 2186905 | 11/1974 | France ................................. 350/635 |
| 2258287 | 8/1975 | France . |
| 56-13234 | 2/1981 | Japan ................................... 350/635 |
| 60-53443 | 3/1985 | Japan ................................... 350/635 |
| 62-203843 | 9/1987 | Japan . |
| 2105276 | 3/1983 | United Kingdom ................ 350/635 |

Primary Examiner—Bruce Y. Arnold
Assistant Examiner—Martin Lerner
Attorney, Agent, or Firm—Fleit, Jacobson, Cohn, Price, Holman & Stern

[57] ABSTRACT

Disclosed is an outside rear-view mirror for a vehicle having a mirror housing which is mounted to a pedestal such that the mirror housing may rock relative to the pedestal upon impact from the front or from the rear. Within the mirror housing means are provided for holding a mirror glass which allow pivoting of the mirror glass about anyone or both of two perpendicular pivot axes, one of which is normally upright and the other of which runs transversely to the car body to which the pedestal is fastened. An adjusting device for adjusting the position of the mirror glass includes a lever mounted to the mirror housing and adapted to rotate about axes which run parallel to the pivot axes of the mirror glass. The first arm of the lever is coupled to a handle which may be manipulated from the interior of the car. A second arm of the lever is coupled to the mirror glass through two spaced articulation joints, the center line of the first of which is placed within a plane including one of the pivot axes and extending perpendicular to the other pivot axis, and the other of which is arranged outside said plane.

14 Claims, 5 Drawing Sheets

OUTSIDE REAR-VIEW MIRROR HAVING A MECHANICALLY ADJUSTABLE MIRROR GLASS FOR A VEHICLE

The invention refers to an outside rear-view mirror for a vehicle, having a mirror glass and a mirror housing and a pedestal which is adapted to be fastened to the car body and to which the mirror housing is rockably mounted.

German utility model specification No. 78 06 907 discloses an outside rear-view mirror for a car, the mirror glass of which may be adjusted by pivoting it about anyone or both of two perpendicular axes, one of which is normally upright and the other of which runs transversely to the car body to which the pedestal is fastened. In the mirror housing a tilting bar is provided with two opposite pins, each being supported within a bracket fastened to the base of the mirror housing, and is provided with two further pins extending from the bar transversely to the first pair of pins and supported within a member fastened to the mirror glass. Bowden cables are hung into the member and extend through the mirror housing and a pedestal of the outside rear-view mirror to which the mirror housing is rockably mounted. The ends of the Bowden cables adjacent the pedestal are connected to a transmission device for transferring a manually caused displacement of a handle into push and/or pull of the Bowden cables. Thus, the position of the mirror glass may be adjusted as desired by a manipulation of the handle which is transferred into a pivoting movement of the mirror glass about said axes.

The known adjustment device for the mirror glass of an outside rear-view mirror for a car is of complex and stiff structure because the Bowden cables are substantially bent along their extension through the pedestal and the hinge connecting the mirror housing to the pedestal.

It is therefore an object of the invention to provide an improved outside rear-view mirror, the mirror glass of which may be adjusted more easily by corresponding manipulation of the handle in the interior of the car. It is a further object of the invention to devise a simple adjustment means of high reliability and extended life time. Moreover, the structure of the adjustment means should preferably not be affected by any rocking movement of the mirror housing.

According to the invention, the outside rear-view mirror for a vehicle has a mirror housing which is mounted to a pedestal such that it may rock relative to the pedestal upon impact from the front or from the rear. Within the mirror housing means are provided for holding a mirror glass which allow pivoting of the mirror glass about anyone or both of two perpendicular pivot axes one of which is normally upright and the other of which runs transversely to the car body to which the pedestal is fastened. An adjusting device for adjusting the position of the mirror glass includes a lever mounted to the mirror housing and adapted to rotate about axes which run parallel to the pivot axes of the mirror glass. A first arm of the lever is coupled to a handle which may be manipulated from the interior of the car. A second arm of the lever is coupled to the mirror glass through two spaced articulation joints, the center line of the first of which is placed in a plane including one of the pivot axes and extending perpendicular to the other pivot axis, and the other of which is arranged outside said plane.

The invention overcomes the drawbacks and inconveniences of known adjustment devices inherent in utilizing Bowden cables and ensures a sensitive adjustment of the position of the mirror glass by manipulating the handle in the interior of the car, and is nevertheless of simple and low cost structure.

While according to a first improvement of the invention the lever may be mounted to the mirror housing such that its center of rotation is placed within said plane, particular advantages are obtained by another embodiment of the invention according to which the center of rotation of the lever is located below said plane, preferably in the vicinity of the hinge by which the mirror housing is coupled to the pedestal. Thereby, the first arm of the lever may be made shorter than the second arm thereof resulting in an advantageous transmission of the displacements of the handle into corresponding alterations of the position of the mirror glass.

According to yet another improvement of the invention the lever is mounted to the mirror housing such that the axis of rotation of the lever which runs perpendicular to said plane coincides with the rock axis of the mirror housing with respect to the pedestal. Thereby, any adverse effects of any rocking movement of the mirror housing on the proper function of the adjustment device are substantially excluded. Specifically, the handle is coupled to the adjustment device through a clutch which frees the handle from following a rocking movement of the mirror housing.

According to a specific embodiment of the invention the lever is mounted in a bearing block fastened to the mirror housing which allows rotation of the lever to the necessary extent. The bearing block is integral with an elongated tubular member co-axial with a second arm of the lever. Within said tubular member a guiding element or shank is confined which may swing within said tubular member about one of the axes of rotation of the lever and is prevented from swinging about the other axis of rotation. The first articulation joint, according to this embodiment of the invention, is provided on said guiding member movably with respect to the second arm of the lever.

According to a different specific embodiment of the invention the lever is held in a through-bore of a rotary member so as to be swingable therein about an axis transverse to the longitudinal direction of the through-bore. On the other hand, the lever is coupled to the rotary member in a way that the rotary member follows any rotation of the lever about the longitudinal axis thereof. The rotary member then is mounted within a cylindric bearing formed from a clamp which is fastened to this mirror housing. The first articulation joint is coupled to the rotary member whereas the second articulation joint is formed from the free end of the second arm of the lever which extends above the rotary member. Therefore, when turning the lever by corresponding manipulation of the handle about its longitudinal axis, the first and the second articulation joints will be displaced correspondingly whereas only the second articulation joint will be displaced when turning the lever about an axis transverse to the longitudinal direction.

The above as well as other objects and advantages and characteristics of the present invention will become apparent from the following description of preferred embodiments thereof with reference to the accompanying drawings.

Figure 2:
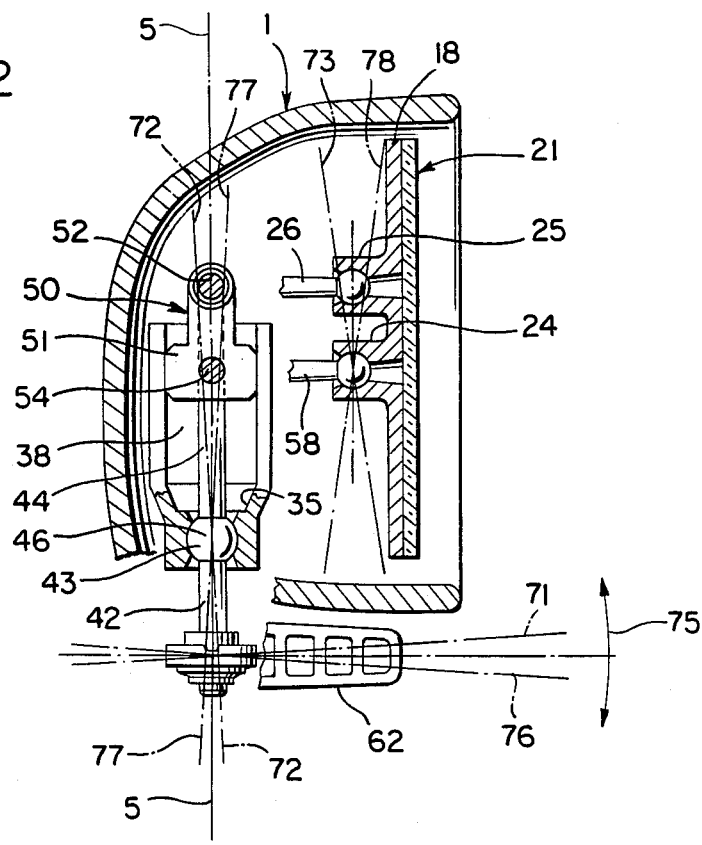
Figure 5:
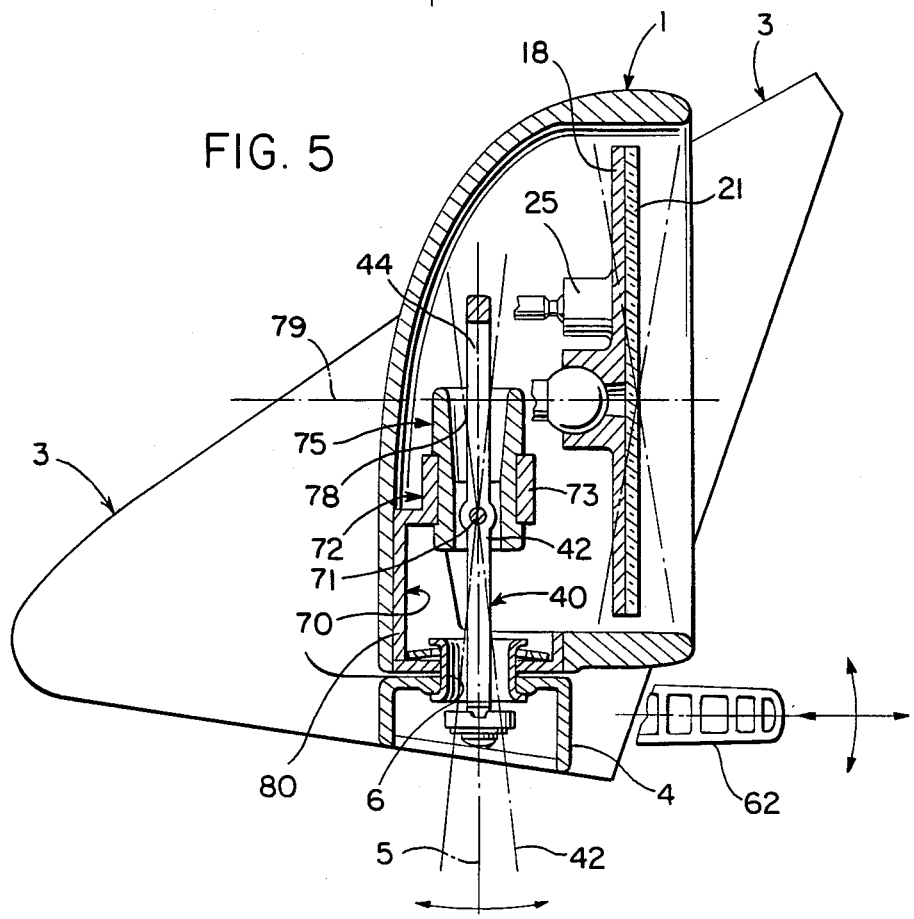
Figure 3:
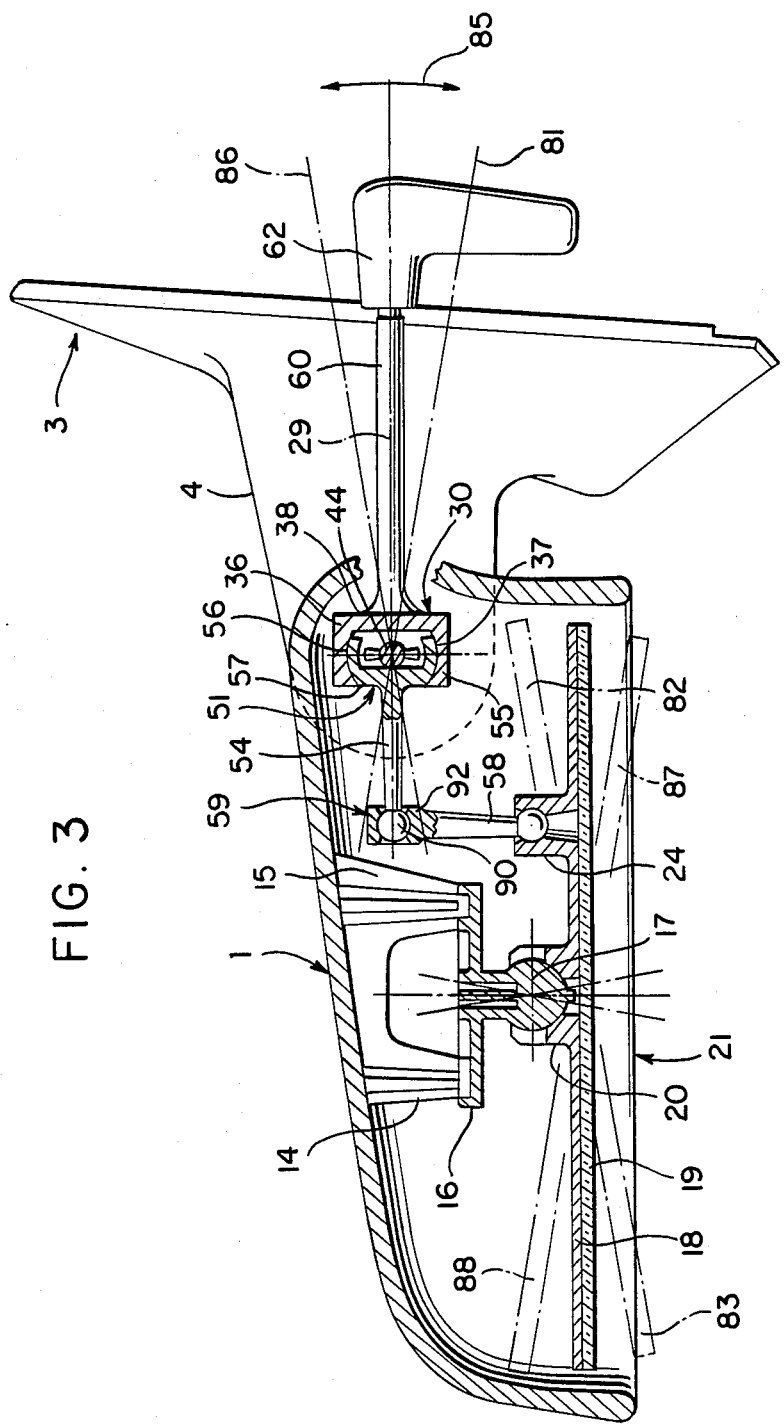
Figure 4:
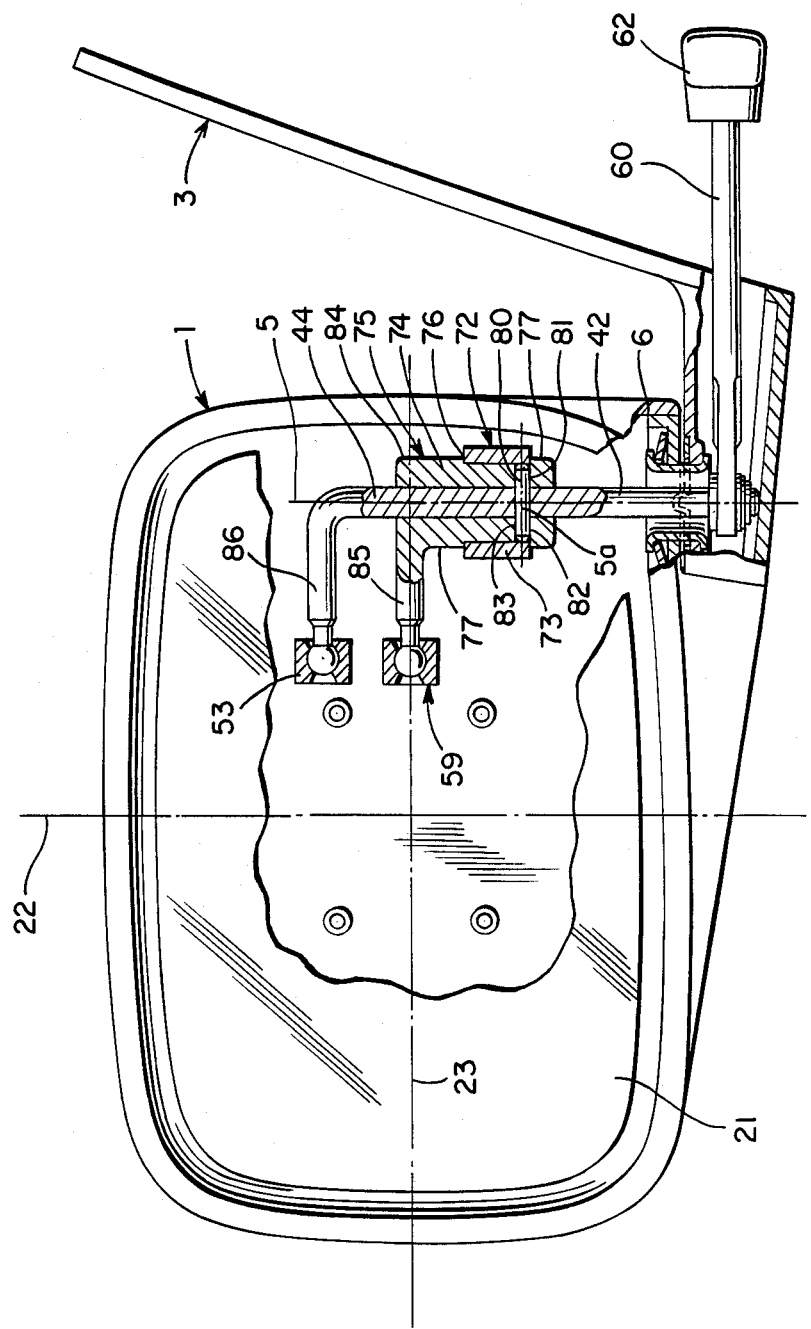
Figure 6:
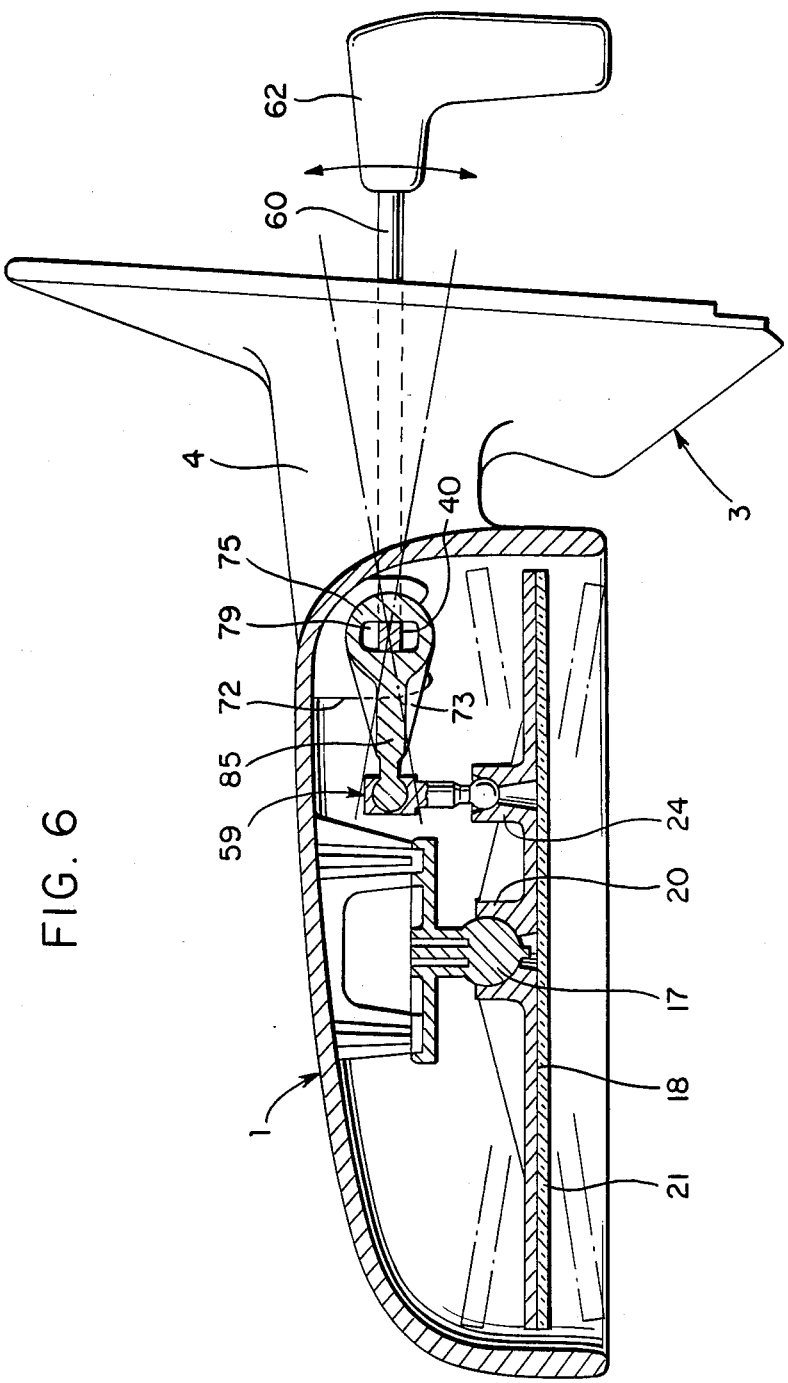

FIG. 1: shows a first embodiment of an outside rear-view mirror for a car seen in direction of traffic partially in section wherein the mirror glass as well as the elements for mounting the mirror glass to the mirror housing are removed for the sake of clarity;

FIG. 2: shows a vertical section through the mirror housing along the line II—II in FIG. 1 wherein portions of the pedestal and the mirror housing are removed;

FIG. 3: shows a vertical section through the mirror housing according to III—III of FIG. 1, the pedestal and the handle being shown schematically in top view;

FIG. 4–6: show a second embodiment of an outside rear-view mirror according to the invention in representations similar to FIGS. 1–3.

According to FIG. 1, a mirror housing 1 of substantially rectangular contour and rounded corners is mounted to a projecting post 4 of pedestal 3. Specifically, a lower portion of the rim of the mirror housing 1 which is close to the post 4 has an opening of same shape and extension as the corresponding opening within an upper portion of the post 4. A first rim 7 of a rivet 6 encompasses the enforced edge 8 of the opening of post 4, and a second rim 9 of the rivet 6 encompasses a strong leaf spring 10 which engages the mirror housing internally around the opening thereof in rim 2. A notched disk 11 surrounding rivet 6 is inserted between the mirror housing 1 and the post 4, the axially extending notch 12 of which engages a corresponding indentation provided for at the exterior of the mirror housing for safely maintaining the normal position of the mirror housing with respect to the pedestal 3. In case of impact from the front or from the rear upon the mirror housing 1, the notch 12 escapes from the indentation so that the mirror housing may rock relative to pedestal 3 about a rock axis 5 which coincides with the axis of the aligned openings in the mirror housing and the post 4.

For mounting the mirror glass 21 to the mirror housing 1 a plate 16 is fastened to stands 14, 15, 27, 28 formed out of an intermediate portion of the base 13 of the mirror housing 1. A ball 17 projects from plate 16 opposite to base 13. The mirror glass 21 includes a light reflecting glass plate 19 and a backing plate 18 to which the reverse side of the glass plate 19 is bonded. The backing plate is formed centrally with a stud 20 opposite to the glass plate 18 having clamping fingers for radially resiliently grasping the ball 17. Thus the mirror glass 21 may be drawn off the ball 17 outwardly against the clamping force of the clamping fingers of stud 20 for maintainance or replacement services. On the other hand, the mirror glass 21 may ride on ball 17 for any desired pivoting movement. Means, not shown, are provided which allow the mirror glass 21 to swing about a first pivot axis 22 which is normally upright and/or about a second pivot axis 23 which runs perpendicular to the first pivot axis and transversely to the car body when the pedestal is fastened thereto. As will be understood from the foregoing, the pivot axes 22, 23 intersect each other in the center of the ball 17 about which the mirror glass 21 may swing. It will also be noted that the normally upright pivot axis 22 extends parallel to the rock axis 5 about which the mirror housing 1 may rock relative to the pedestal 3.

An elongated bearing block 30 is formed integral with the base 13 close to and above the rivet 6. Alternatively, the bearing block 30 may be made as a separate member and may be fastened to the mirror housing. The bearing block 30 has a through-bore which extends over the total length of the bearing block 30 and which has an axis coinciding with the rock axis 5. The bearing block 30 has a lower portion 31 wherein the through-bore is spherically widened to a bearing for a ball 43 of a lever 40. The upper portion 32 of the bearing block 30 extends above a plane including pivot axis 23 and extending perpendicular to pivot axis 22 and opens opposite to the pedestal 3 in form of a cut-out 33. While the inner wall opposite to the cut-out 33 of the upper portion 32 is flush and plane, the opposing inner walls 36, 37 of the upper portion 32 are contoured such that they form a cylindric bearing the axis of which coincides with the rock axis 5. Such cylindric bearing is provided along the portion of bearing block 30 from which the outcut 33 is made.

A lever 40 is supported within the through-bore 35 of the bearing block 30 which may be made from plastic material by inserting the ball 43 of the lever 40 into the ball bearing provided for in the lower section 31 of bearing block 30. A first arm 42 of the lever 40 extends from the ball 43 through the rivet 6 into the interior of post 4. A second arm 44 of the lever 40 extends from the ball 43 through the through-bore 35 of the upper section 32 and projects above the end of bearing block 30 and is aligned with the first arm 42. The free end of the second arm 44 is formed to a journal 45 extending transversely to the longitudinal direction of the second arm 44. A shank 50 has a flat main body 57 from which two parallel coupling arms 52, 54 project away towards the stands 15, 28. Opposite to said coupling arms, two arcuated walls 55, 56 are formed out of the main body 57 the outer contours of which are adapted to the cylindrically formed inner walls 36, 37 of the upper section 32 of the bearing block 30 on one hand and are spherically formed when seen in a transverse section on the other hand. A blind bore is drilled into the shaft of the upper coupling arm 52 within which the journal 45 is received. Thus, when shank 50 is coupled to the second arm 44 by locating the journal 45 within the blind bore of coupling arm 52, the arcuated walls 55, 56 abut the inner walls 37, 36, respectively while the main body 57 extends alongside the second arm 44 which is spaced radially to walls 55, 56.

Both coupling arms 52,54 are positioned well behind the mirror glass 21 such that the center line of the lower coupling arm 54 lies within a plane including pivot axis 23 and being perpendicular to pivot axis 22. The upper control arm 52 has to be positioned outside said plane but its distance to the lower control arm 54 is not critical. In the illustrated embodiment the coupling arms 52 and 54 extend parallel to each other. As to the second arm 44 it is to be understood that the arcuated flanges 55, 56 and the main body 7 surround the corresponding portion of the second arm 44 with leaving sufficient clearance for swinging movements of said arm relative to the shank 50 as will be explained more in detail hereinafter. It also may be understood that the lower coupling arm 54 of shank 50 extends through the cut-out 33 whereas the upper coupling arm 52 is arranged above the bearing block 30. Moreover, the unique outer contours of the flanges 55, 56 allow two kinds of rotation of the shank 50 within the through-bore 35. A first type of rotation is one which takes place about an axis running parallel to pivot axis 23 within said plane, and a second type of rotation may be effected under control of the lever 40 about the rock axis 5 which coincides with the longitudinal axis of the lever 40 and the center line of the through-bore 35.

Both coupling arms 52, 54 each connect to a first articulation joint 53 and a second articulation joint 59, respectively. Specifically, each of the coupling arms 52, 54 terminates in a ball, each ball being captured within a cage formed at one end of an upper link 26 and of a lower link 58, respectively. The opposite ends of each link 26, 58 are coupled to a stud 25 and a stud 24, respectively, formed in vertical spaced relationship from the rear surface of backing plate 18. It is to be noted that the center line of the lower stud 24 extends within a plane including pivot axis 23 and perpendicular to pivot axis 22.

The first arm 42 of the lever 40 extends from the ball 43 opposite to the second arm 44 and extends through both aligned openings provided for in the mirror housing 1 and post 4 and terminates in a coupling within post 4. The coupling is connected to one end of a control rod 60 extending transversely to the lengthwise direction of lever 40 from the coupling through the interior of post 4 and through an opening thereof, and is adapted to terminate in the interior of a car to which the pedestal 3 is fastened. Normally, the pedestal 3 is fastened to the driver's door of the car. A handle 62 is mounted to the end of control rod 60 opposite to the coupling.

The control rod 60 may be mounted rigidly to the arm 42 in case provisions are made in the structure of post 4 and in the door of the car to which pedestal 3 is fastened which allow sufficient displacement of the control rod 60 caused by a rocking of the mirror housing 1. Normally, however, such free space for the control rod 60 is not available. Therefore, the control rod 60 is mounted to the arm 42 in such a fashion that lever 40 may rotate about the rock axis 5 without correspondingly affecting control rod 60. Specifically, the free end of the first arm 42 penetrates a hole formed in the disk-like end 61 of the control rod 60. A spring element 41 is interposed between the other side of the end 61 and fastening means in form of a nut or the like are screwed on the free end of the first arm 42 downward the end 61 of the control rod 60. A nose protrudes downwardly from a radially thickened portion of the first arm 42 for engagement with a groove formed in the disk 61. Thus, when the mirror housing 1 resumes its normal position relative to pedestal 3, i.e. when notch 12 engages its groove in the rim of the mirror housing, the nose is caught within the groove of disk 61 under the influence of the spring element 41 to the effect that the control rod 60 is firmly coupled to lever 40. When the mirror housing 1 rocks, the nose escapes its groove so that the control rod 60 is decoupled from lever 40 as far as the transmission of rotations of the lever 40 is concerned. Therefore, during rocking of the mirror housing 1 the lever 40 may rotate about the rock axis 5 relative to the control rod 60 without affecting the handle 62.

After assembly of the adjustment device as illustrated and explained above, the position of the mirror glass 21 may be set as desired by manually displacing handle 62. In plan view the handle is modelled to the form of an L one leg of which is fixed to the free end of the control rod 60 such that the free second leg points to the rear with respect to the direction of traffic. This feature has the advantage that upward displacement of the free leg yields in an upward adjustment of the mirror glass 21 and that downward displacement of the free leg yields to a downward adjustment of the mirror glass 21 as will be explained hereinafter.

For upward adjustment of the mirror glass 21, the free leg is pressed slightly upwardly, whereby simultaneously the handle 62 rotates slightly above the drawing plane of FIG. 1 about the middle line 5a of ball 43 which runs parallel to the pivot axis 23. Consequently, the second arm 44 is tilted below he drawing plane of FIG. 1 which leads to a forward (with respect to the direction of traffic) displacement of upper coupling arm 52 tilting the mirror glass 21 about pivot axis 23 in view of the fact that lower coupling arm 54 maintains its position. This is true because the confinement of the flanges 55, 56 between inner walls 37, 36 to the effect that the shank 50 only may rotate about an axis parallel and behind pivot axis 23. The dash-point imaginary lines 71, 72, 73 (FIG. 2) illustrate the position of the handle 62 with control rod 60 and the lever 40 and the mirror glass 21, respectively.

Downward adjustment of the mirror glass 21 is effected by slightly pressing downwardly the free leg of handle 62. Such manipulation leads to tilting of lever 40 about the center line 5a of ball 43 in the reverse direction so that the second arm 44 swings above the drawing plane of FIG. 1. Again only while the lower coupling arm 54 only rotates about its own center line and maintains its position relative to the mirror housing 1. Consequently, the section of the mirror glass 21 above pivot line 23 is pushed outwardly about pivot axis 23 which means a downward adjustment of the position of the mirror glass 21. Dash-point imaginary lines 77, 78, 79 demonstrate the positions of the handle with control rod 60 and the lever 40 and the mirror glass 21, respectively. Arrow 75 shows the up and down displacement of the free leg of the handle 62 for effecting a corresponding adjustment of the mirror glass 21. It therefore will have been understood that in the adjustment device according to the invention the lower coupling arm 54 remains inactive when the mirror glass 21 is to be adjusted upwardly or downwardly.

For outward or inward adjustment of the position of the mirror glass 21 about the pivot axis 22 the handle 62 is shifted forwardly or rearwardly as indicated by arrow 85. By forward shifting of handle 62 a rigid coupling of the control rod 60 to the first arm 42 of the lever 40 rotates about rock axis 5 to the effect that both coupling arms 52, 54 rotate correspondingly about the last mentioned axis. This is particularly true with respect to the lower coupling arm 54 as the flanges 55, 56 may rotate within the through bore 35 of bearing block 30 about axis 5 and in view of the width of the cut-out 33. In the embodiment of the invention as shown in FIGS. 1-3 the studs 24, 25 are formed in plan view between ball 17 and bearing block 30. Therefore, the rearward rotation of coupling arms 52, 54 results in an outward adjustment of the mirror glass 21 about pivot axis 22. It is to be noted that studs 24, 25 are aligned parallel to pivot axis 22. Dash-point imaginary lines 86, 87, 88 illustrate the position of the handle 62 with control rod 60 and the mirror glass 21, respectively.

On the other hand if according to a different embodiment of the invention, the studs 24, 25 are formed from the backing plate 18 opposite to the ball 17, forward shifting of handle 62 would yield to an inside adjustment of the mirror glass 21.

Rearward shifting of handle 62 leads to turning of lever 40 in the reverse direction about axis 5 to the effect that both coupling arms 52, 54 are swung synchronously forwardly, whereby the mirror glass 21 is adjusted inwardly about pivot axis 22. Dash-point imaginary lines 81, 82, 83 explain the positions of the handle 62 with the control rod 60 and the mirror glass 21, respectively.

From the foregoing description it may be understood that a simplier embodiment of the invention may be devised wherein the ball 43 and its associated bearing are positioned within a plane including pivot axis 23 and perpendicular to pivot axis 22. In this embodiment of the invention a special shank 50 may be dispensed with.

Moreover, all above mentioned ball joints may be replaced by universal joints.

Yet, a further embodiment of the invention is shown in FIGS. 4-6. Like parts to the first embodiment shown in FIGS. 1-3 are assigned the same reference numerals. The embodiment of the invention according to FIGS. 4 and 6 allows an easier assembly of the various parts of the adjustment device than in the first embodiment.

A clamp 70 is fastened to an inner surface of mirror housing 1 above the rivet 6 by a flange 71 and is equipped with a cylindrical bearing 72, the axis of which coincides with the rock axis 5. The cylindrical wall 73 of the bearing 72 is cut away over a portion of its circumference which allows insert of a rotary member 75 laterally into the bearing 72, thereby utilizing a radial elasticity of the cylinder wall 73. The rotary member 75 has a cylindrical outer contour over a portion 74 of its length.

Above and below the cylindric wall 73, the rotary member 75 is provided with radially outwardly extending shoulders 76, 77 which allow safe hold of rotary member 75 within the bearing 72 and a rotation thereof about the rock axis. An axial through-bore is cut out from the rotary member 75, the lower section 78 of which close to the rivet 6 has a width in the drawing plane of FIG. 5 which is greater than the width of lever 40, and the upper section 79 of which is upwardly conically expanded.

According to FIG. 6, the cross section of both sections 78, 79 is rectangular and adapted to the cross section of the lever 40 for allowing the lever 40 to swing within a plane according to the drawing plane of FIG. 5 and not to rotate about its length axis within the sections 78, 79. The swinging movability of lever 40 within the sections 78, 79 is ensured by a pivot pin 80 which penetrates laterally a bore 83 of lever 40 and the opposing ends of which are rotatably supported in aligned radial bores 81, 82 of the rotary member 75. The pivot pin 80 is positioned within the bore 83 such that the length axis 5a thereof runs parallel to the pivot axis 23. A lower coupling arm 85 is formed from a portion 84 of the rotary member 75 which extends above the bearing 72. The position and the function of the lower coupling arm 85 with respect to the pivot axes 22, 23 correspond to the position and function of the lower coupling arm 54. Thus, lower coupling arm 85 may pivot about the rock axis 5 as does the rotary member 75 which pivoting movement is ensured by the bearing 72.

The upper free end of the second arm 44 of lever 40 is rectangularly extended to an upper coupling arm 86 which corresponds to the upper coupling arm 52. Thus lower coupling arm 85 and upper coupling arm 86 extend parallel with respect to each other in spaced relationship.

It may be seen that the lever 40 may rotate about rock axis 5 only together with an identical rotation of rotary member 75. On the other hand, lever 40 may swing within the sections 78, 79 of the through-bore about the pivot pin 80 without any corresponding displacement of the rotary member 75. The rotary member 75 in fact is only allowed to rotate within the bearing 72 about the rock axis 5.

From the above description of the embodiment of the invention shown in FIGS. 4-6, it may be understood that the function and operation of the adjustment device are identical to those as explained with reference to the first embodiment of the invention as far as the transmission of the manually caused displacements of lever 62 into corresponding displacements of the lower coupling arm 85 and the upper coupling arm 86 are concerned.

While preferred embodiments of the invention have been illustrated and described, it will be understood that various changes and modifications may be made without departing from the spirit of the invention.

What is claimed is:

1. An outside rear-view mirror for a vehicle, said rear-view mirror comprising:
   a mirror housing mounted to a pedestal such that said mirror housing may rock relative to said pedestal upon impact,
   a mirror glass held within said mirror housing,
   pivot means holding said mirror glass within said mirror housing for pivoting said mirror glass about at least one of two perpendicular pivot axes, one of said pivot axes being normally upright and the other of said pivot axes running transversely to a vehicle to which said pedestal is fastened,
   an adjusting device for adjusting the position of said mirror glass,
   said adjusting device including a lever mounted to said mirror housing and adapted to rotate about rotational axes running parallel to said pivot axes of said mirror glass, and
   a first arm of said lever being coupled to a handle which may be manipulated from an interior of the vehicle, a second arm of said lever being coupled to said mirror glass through two spaced articulation joints, the first of said articulation joints being placed within a plane including one of said pivot axes and extending perpendicular to the other of said pivot axes positioned outside said plane, both of said two articulation joints including a coupling arm and a link, one end of said coupling arm being integral with said lever and one end of said link being secured to said mirror glass, the other end of said coupling arm and the other end of said link forming a ball captured within a cage for pivotal movement of said link by movement of said lever to pivot said mirror glass about said pivot means.

2. Outside rear-view mirror according to claim 1, wherein said lever is adapted to be rotated about a center which is placed within said plane.

3. Outside rear-view mirror according to claim 1, wherein a rotational axis of said lever running transversely to said plane coincides with a rock axis of said mirror housing.

4. Outside rear-view mirror according to claim 3, wherein said handle is coupled to a free end of said first arm for being rotatable with respect to said lever about one of said rotational axes of said lever.

5. Outside rear-view mirror according to claim 4, wherein said handle is connected to a clutch provided for at said free end of said first arm and adapted to deactivate the coupling of said handle to said lever with respect to one of said rotational axes of said lever.

6. Outside rear-view mirror according to claim 1, wherein an intersection of said rotational axes of said lever is positioned close to a rivet coupling said mirror housing to a post of said pedestal.

7. Outside rear-view mirror according to claim 6, wherein a shank is connected to said second arm of said lever and is coupled to the first articulation joint and to the second articulation joint.

8. Outside rear-view mirror according to claim 7, wherein said lever is supported within an elongated bearing block fastened to said mirror housing and includes a bearing for a ball formed on said lever and includes a second bearing for said shank axially above said ball.

9. Outside rear-view mirror according to claim 8, wherein said articulation joints are coupled to said mirror glass between a mount for mounting said mirror glass rotatably to said mirror housing and said bearing block.

10. Outside rear-view mirror according to claim 1, wherein said lever is supported swingably within a rotary member which is rotatably mounted to said mirror housing.

11. Outside rear-view mirror according to claim 10, wherein said rotary member is rotatably supported by a clamp fastened to said mirror housing.

12. Outside rear-view mirror according to claim 11, wherein a rotational axis of said rotary member as defined by said clamp coincides with a rock axis of said mirror housing.

13. Outside rear-view mirror according to claim 10, wherein the second articulation joint is formed from an end of said second arm of said lever projecting above said rotary member, and wherein the first articulation joint is formed from said rotary member.

14. An outside rear-view mirror for a vehicle, said rear-view mirror comprising:
  a mirror housing mounted to a pedestal such that said mirror housing may rock relative to said pedestal upon impact,
  a mirror glass held within said mirror housing and adapted for pivoting about at least one of two perpendicular pivot axes, one of said pivot axes being normally upright and the other of said pivot axes running transversely to a vehicle to which said pedestal is fastened,
  an adjusting device for adjusting the position of said mirror glass,
  said adjusting device including a lever mounted to said mirror housing and adapted to rotate about rotational axes running parallel to said pivot axes of said mirror glass, said lever being swingably supported within a rotary member rotatably mounted to said mirror housing,
  a first arm of said lever being coupled to a handle which may be manipulated from an interior of the vehicle, a second arm of said lever being coupled to said mirror glass through two spaced articulation joints, the first of said articulation joints being placed within a plane including one of said pivot axes and extending perpendicular to the other of said pivot axes, positioned outside said plane, the second of said articulation joints being formed from an end of said second arm of said lever projecting above said rotary member, and wherein the first articulation joint is formed from said rotary member.

* * * * *